Patented July 24, 1934

1,967,268

UNITED STATES PATENT OFFICE 1,967,268

FABRIC AND METHOD OF AND COMPOSITION FOR MAKING THE SAME

William Bennett Serrington, Roxbury, Mass., assignor to Charak Chemical Company, Boston, Mass., a corporation of Massachusetts No Drawing. Application February 11, 1930, Serial No. 427,641

14 Claims. (Cl. 91—68)

The present invention relates to methods of treating fabrics and to the fabrics produced thereby, also to compositions of matter for treating fabrics. As the invention is considered to be of wide scope, the term "fabric", as used in the specification and claims, will be understood to include not only textile fabrics, but also other substances, such as wood and wood-pulp articles, like paper and cellu-cotton, and other unwoven articles, also rubber and other gum-coated cloth or paper, including flocked material, impregnated with textile-fabric dust, also leather and the like.

An object of the invention is to produce a new and improved fabric that, though not strictly waterproof, is water shedding or repellant; which, therefore, may be cleaned by the mere application of soap and water, without thorough washing; that is as flexible and pliable as the original fabric before treatment; and that will retain its properties notwithstanding it is subjected to mechanical disrupting forces. The product may be used for ordinary dress purposes, for insulation, condensers, medicinal purposes and other uses. Other objects will appear hereinafter, and will be particularly pointed out in the appended claims.

The fabric is first immersed in a liquid comprising a suitable water-shedding substance dissolved in a suitable solvent. A very satisfactory water-shedding substance is a nitro-cellulose solution or a cellulose compound, like pyroxylin, ordinary nitro-cellulose or cellulose acetate. A satisfactory compound is 25% cellulose derivative, 11% alcohol, and equal proportions of butyl acetate and toluol. Its water-shedding properties may, however, be increased by combining it with paraffin wax, beeswax, gums or other equivalent. Paraffin wax has been found most satisfactory. Ethyl acetate or other acetate may be used for the solvent, but it is preferred to employ a mixture of ethyl and butyl acetates, wood alcohol and toluol, with a small proportion of naphtha. In order not to affect the flexibility and softness of the ultimate fabric, a softening agent is employed. Paraffin waxes may be used as softening agents, but oils and other substances may be used, as hereinafter explained. Petroleum jelly has been found to operate very well, in practice. In order to toughen the resulting product against mechanical abrasion, a solution of a rubber compound may be added. The rubber compound may be ordinary crude Ceylon or para crepe rubber, dissolved in a suitable solvent, such as benzol or toluol. These solvents are found preferable to solvents like naphtha. Other solvents, like carbon tetachloride, are unsuitable because they are not solvents of the cellulose derivative. The rubber obtainable in the market under the name rubber cements may also be used. A very efficient mixture, for certain types of fabrics, is 50 parts solvent to ¾ parts wax, 1 part petroleum jelly and about 1 part each of nitro-cellulose and rubber compound. The wax, heated and in liquid form, is first added to the solvent and stirred, and the petroleum jelly added. The rubber compound and the cellulose-derivative paste are then each dissolved in a little of the solvent and mixed together, after which the first-named liquid is stirred in. The solution is then heated to about a blood heat, and the fabric is dipped into the heated solution. If desired, the wax, the cellulose derivative and the other ingredients may be separately dissolved in the solvent or solvents, and the fabric may be passed first through the solution of the wax and then through the solution of the cellulose derivative, the petroleum jelly and the rubber in any suitable combination or order. Better results appear, however, to be obtained when the ingredients are mixed together in a single solution. From this solution, the fabric is led to any device for treating it with the liquid, such as one or more pairs of squeezing rolls, scrapers and dipping or spraying mechanism. Using sprayers or scrapers or similar mechanisms, the solution penetrates the fabric, but not so deeply. For some kinds of fabrics, indeed, like glazed paper, when used for condensers, it may not be desired to have the solution penetrate too deeply. When cable-insulation fabrics are treated, on the other hand, the solution may penetrate very deeply into the fabrics. The use of squeezing rolls or their equivalent is preferred when it is desired to cause the solution to be driven or forced or thoroughly impregnated into the fabric. In addition to this function, the rolls also act to remove the excess liquid from the fabric. An excess of the liquid might introduce an undesirable stiffness in the fabric. The fabric is then allowed to dry. This may be done in the open air, but the drying process may be hastened by a drying fan, or the application of heat, such as by the use of drying boxes, pressing with hot irons, or using mangling rolls. The heat causes the chemical to set into the fabric, preventing it from peeling away. The resulting product is found to be as soft, flexible and pliable as the original, untreated fabric, and will shed or repel water. The appearance of the fabric, too, will be unaffected by the treatment, assuming that the ingredients have been used in the proper proportions. If improper proportions are used, for example, the paraffin may separate out from the cellulose, producing an undesirable, white-deposit effect. If the threads of the fabric form a large mesh, some of the water may even pass through the fabric, but without in the slightest wetting the fabric. The water simply does not penetrate the fabric. It follows from this property that any dirt or stain, unless it be of a nature that attacks the celluloid,—which is not often the case,—may be washed from the fabric merely by applying soap and water, as with a moist cloth, to dissolve away the dirt or stain. The fabric may, indeed, be actually washed or laundered in the ordinary way; and after drying, it may even be pressed with hot irons. The fabric will still retain its originally endowed property of shedding or repelling water, and it will not have been injured in the slightest by this treatment. The fabric may also be cleansed with gasoline or other cleansing fluids without affecting its water-repelling quality.

Though the above-mentioned proportions are found to be preferable, and applicable to almost any fabric, they may be varied as desired, and particularly according to the nature of the fabric employed. Using the same unit proportions of wax, petroleum jelly, cellulose derivative and rubber compound, for example, the proportion of solvent may be increased to as much as 100 and more, if desired. The proportions of wax, petroleum jelly, cellulose derivative and rubber compound may also be varied. Thus, it is possible to use one part solvent, one-eighth part wax, one-half to one part cellulose derivative, and about the same proportion of rubber compound. The proportions of cellulose derivative to rubber compound may also be varied. Increasing the amount of rubber employed results in greater water-shedding properties and increases the flexibility and the toughness, it being found, however, that too much rubber has a tendency to reduce the flexibility of the resulting product, and too little leaves the chemical too soft, so as to permit easy abrading of the cloth. Too much cellulose derivative, too, produces a stiffened and heavier fabric. When too much rubber is employed, the effect is sometimes worse than if rubber alone were used, without any cellulose derivative at all. It is possible to use rubber alone, without the cellulose derivative, but better results are obtained in the combination described. The elimination of the rubber causes the fabric to lose its water-shedding properties after fewer washings than when the rubber is also employed. At the other extreme, altogether too much rubber may fill up the holes of the fabric, thus preventing the fabric from "breathing". Though the rubber toughens the celluloid, it in no way affects the flexibility of the fabric.

If desired, the fabric may be passed successively through several baths the ingredients of which are contained in varying proportions.

The above proportions are found to be very effective for sateens, light silks, silk crepes, cotton goods, woollen goods and cretonne. If, however, a heavier body, like duck, canvas, etc., is treated, it may be desired to vary the proportions so as to have, for example, five parts of solvent to one part wax and suitable proportions of cellulose derivative and rubber, such as one part cellulose derivative and one part rubber. The increased proportion of cellulose derivative gives a heavier body to the liquid. The proportions of rubber compound also may be varied, depending on the above considerations. Using such heavier mixtures, and applied to such heavier fabrics, the water-shedding properties begin to take on more of a water-proofing nature. Even in such cases, however, the fabric treated is not strictly and accurately water-proofed, but water shedding. Waterproofed products are usually much harder and stiffer than is characteristic of the present invention.

Other softening agents, as above stated, may be used for increasing the flexibility of the goods, such as animal and vegetable fats, greases or oils, like cottonseed oil, machine oil, linseed oil, and castor oil, glycerine, gum, like shellac and gum arabic, gelatine, fish glue, etc. Some of these substances, such as glue and gums, are themselves, to a greater or lesser degree, water shedding. At times, these substances may be used in combination, for example, both wax and oil may be used in the same solution. An emulsion of soap and water may, if desired, be added to the softening agent. The water evaporates away, leaving the emulsion of the oil or wax and soap which can then be dissolved in a suitable solvent. Other substances may, of course, also be added, depending upon the nature of the results desired. In all cases, it should, however, be borne in mind that the additional substances should not materially interfere with the penetration of the cellulose derivative, rubber and wax, or their equivalents, into the fabric. Thus, benzene or naphtha, or turpentine, though all good solvents of paraffin wax, can not dissolve the cellulose derivative. If, therefore, for some reason, some such non-solvent of the cellulose derivative is desired to be used for some specific purpose, it must be used in small enough quantities so as not to interfere with the penetration of the cellulose derivative and the rubber into the fabric. Usually, no such non solvent is desirable, for benzene, for example, seems to have a tendency to introduce a usually unwanted unevenness of fibre and harshness in the febric. Solvents like benzine, furthermore, by preventing penetration of the cellulose derivative and the rubber into the cloth, have a tendency to cause the celluose derivative and the rubber to peel away from the fabric. Fabrics treated with benzine or its equivalent, moreover, will peel, because the benzine prevents the penetration of the cellulose derivative; while the present invention results in an intimate union between the cellulose derivative and rubber combination and the fabric, the cellulose derivative and rubber combination of which can not peel. The proportions of emulsion to solvent may be as little or as great as desired, say, from ⅛ of 1% to 150%.

Mention has been made above of papers treated in accordance with the present invention for condenser purposes. A very effective mixture for treating the paper is 25 parts solvent, ¾ parts paraffin wax, ½ part castor oil, 4 parts cellulose derivative, and ¼ part rubber compound. The use of paraffin alone renders the paper sticky and tacky, which is not true of papers treated by the present method. Paraffin alone, furthermore, absorbs moisture, which the present invention avoids. The dielectric qualities of the paper become greatly increased, and for this reason, it is found that the cord for insulating electric wires may also be treated by the present process.

Further considerations leading to the proper proportions will depend upon the color of the goods, as some proportions will cause the colors to run, and others will not. Where white goods are employed, alum or camphor dissolved into the solvent with the oil or the wax will tend to prevent destroying the whiteness, particularly where the solution is otherwise cloudy. A very slight amount of alum or camphor is required for this purpose. Coloring matters, and metallic or other powders, may be added to the solution if it is desired to color or bronze the fabric while treating it. When metallic powders are used, it is preferred to coat one side only of the fabric with the solution, as bronzing is not ordinarily desirable on both sides of the fabric. Even in such cases, the cellulose derivative and the rubber will be found to penetrate into the cloth. Indeed, unless the fabric is very thick, it may go through the cloth to the other side. The bronzing, however, shows under the microscope as discreet particles.

The theory of the operation is not fully understood. The volatile constituents of the solvent evaporate away, seeming to cause the cellulose derivative, thus dried out, and toughened by the rubber, to contract in against the various parts of the fibers of the fabric. Of course, the greater the proportion of solvent employed, the more flexible will be the fabric, but if too much solvent is employed, the fabric may not be sufficiently water-shedding. The wax or its equivalent seems to increase the water-shedding properties of the cellulose derivative and the rubber, and the petroleum jelly or its equivalent seems to coalesce with the cellulose derivative and the rubber when in the fabric to form a unitary substance having considerably greater flexibility than the cellulose derivative alone, but without substantially affecting the body of the resulting product. Whatever may be the theory, it is found that, though the flexibility of the fabric is unimpaired, the cellulose derivative and the rubber, both coalesced together, have penetrated deeply into the cloth, apparently becoming a permanent part thereof. It is to this penetrating effect, indeed, that the non-peeling character of the softened cellulose derivative is probably due. This result, it will be noted, is obtained without vulcanizing, which would harden the fabric. As the individual threads are thus impregnated with the softened, rubber-toughened cellulose derivative, they will float in water without absorbing any of it. The threads are found, under the microscope, to be coated with the chemical, with the coating thickened at the thread intersections, but with the spaces between the threads unfilled, to permit "breathing." The untreated threads, as is well known, will soak up water like a sponge. The untreated thread, under the microscope, shows a fuzzy, bunchy, uneven surface over each strand of the thread, while the treated thread has the appearance of a well defined, compact, smooth, unbroken surface. The flexibility of the fabric is in part believed to be due to the fact that so comparatively little of the solution is left in the goods after the squeezing rolls have acted to drive out the excess liquid. If large quantities of the liquid were permitted to dry on the fabric, it might leave the cellulose derivative and rubber in more or less of a harsh, coarse, stiff-sheet form, instead of merely acting upon the individual fibers of the fabric, to produce the fine, soft, pliable, flexible article of the present invention.

Modifications will occur to persons skilled in the art and all such are considered to fall within the spirit and scope of the present invention as defined in the appended claims. It is desired that the claims be construed broadly except insofar as limitations may be necessary in view of the prior art.

What is claimed is:

1. A method of treating fabrics that comprises passing the fabric through a bath comprising a nitro-cellulose solution, wax, petroleum jelly and a rubber compound all dissolved in a solvent in the proportions 50 parts solvent, 1 part petroleum jelly, ¾ part wax, 1 part nitro-cellulose and 1 part rubber compound, passing the fabric from the bath through squeezing rolls to drive the liquid into the fabric and remove the excess liquid, and subjecting the fabric after it leaves the rolls to heat to evaporate the solvent and cause the wax-containing cellulose substance to become set in the fabric.

2. A composition of matter comprising about 1 part of a nitro-cellulose substance, about 1 part of rubber and about ¾ part paraffin wax dissolved in a solvent.

3. A composition of matter comprising about 1 part of a nitro-cellulose substance, about 1 part of rubber, about ¾ part paraffin wax and about 1 part petroleum jelly dissolved in about 50 parts of a solvent.

4. A fabric having impregnated within, but not substantially between, the threads thereof, an impregnating agent comprising a water-shedding nitro-cellulose substance, a wax-and-petroleum softening agent for rendering the substance flexible, and a rubber compound for toughening the resulting product, whereby the fabric is endowed with water-shedding properties, is toughened, and retains its flexibility and appearance.

5. A method of rendering a fabric water-shedding that comprises impregnating the fabric with a liquid or liquids containing an impregnating agent comprising a water-shedding, nitro-cellulose substance, a softening agent and petroleum jelly for rendering the substance flexible, and a rubber compound, removing the impregnating agent from substantially between the threads of the fabric, and evaporating the liquid to solidify the impregnating agent within the threads, whereby the impregnating agent becomes impregnated within, but not substantially between, the threads, and whereby the fabric becomes endowed with water-shedding properties and retains its flexibility and appearance, the rubber compound serving to toughen the resulting product.

6. The process of treating textile fabrics which consists in immersing the fabric in a volatile solvent in which are dissolved a plastic and a softener both of which are water-repellent and in which is dissolved also a toughening agent, the plastic being resistant to the attacks of heated washing fluids, and the plastic and the softener when united together in, and with, the fabric being as a unit resistant to the attacks of the heated washing fluids, removing the excess solution from the threads of the fabric and from between said threads so as to leave only sufficient to impregnate the individual threads to render the fabric water-repellent but of substantially the same flexibility and pliability as the original fabric, and evaporating the remainder of the solvent to cause the plastic and the softener to become united together and to become united with and impregnated within, but not substantially between, said threads.

7. The process of treating textile fabrics which consists in immersing the fabric in a volatile solvent in which are dissolved a cellulose derivative and a softener both of which are water-repellent and in which is dissolved also a toughening agent, the cellulose derivative being resistant to the attacks of heated washing fluids, and the cellulose derivative and the softener when united together in, and with, the fabric being as a unit resistant to the attacks of the heated washing fluids, removing the excess solution from the threads of the fabric and from between said threads so as to leave only sufficient to impregnate the individual threads to render the fabric water-repellent but of substantially the same flexibility and pliability as the original fabric, and evaporating the remainder of the solvent to cause the cellulose derivative and the softener to become united together and to become united with and impregnated within, but not substantially between, said threads.

8. The process of treating textile fabrics which consists in immersing the fabric in a volatile solvent in which are dissolved an amorphous organic plastic and an organic softener both of which are water-repellent and in which is dissolved also a rubber compound, the plastic being resistant to the attacks of heated washing fluids, and the plastic and the softener when united together in, and with, the fabric being as a unit resistant to the attacks of the heated washing fluids, removing the excess solution from the threads of the fabric and from between said threads so as to leave only sufficient to impregnate the individual threads to render the fabric water-repellent but of substantially the same flexibility and pliability as the original fabric, and evaporating the remainder of the solvent to cause the plastic and the softener to become united together and to become united with and impregnated within, but not substantially between, said threads.

9. The process of treating textile fabrics which consists in immersing the fabric in a volatile solvent in which are dissolved an amorphous organic plastic and a wax both of which are water-repellent and in which is dissolved also a toughening agent, the plastic being resistant to the attacks of heated washing fluids, and the plastic and the wax when united together in, and with, the fabric being as a unit resistant to the attacks of the heated washing fluids, removing the excess solution from the threads of the fabric and from between said threads so as to leave only sufficient to impregnate the individual threads to render the fabric water-repellent but of substantially the same flexibility and pliability as the original fabric, and evaporating the remainder of the solvent to cause the plastic and the wax to become united together and to become united with and impregnated within, but not substantially between, said threads.

10. The process of treating textile fabrics which consists in immersing the fabric in a volatile solvent in which are dissolved a cellulose derivative and a wax both of which are water-repellent and in which is dissolved also a toughening agent, the cellulose derivative being resistant to the attacks of heated washing fluids, and the cellulose derivative and the wax when united together in, and with, the fabric being as a unit resistant to the attacks of the heated washing fluids, removing the excess solution from the threads of the fabric and from between said threads so as to leave only sufficient to impregnate the individual threads to render the fabric water-repellent but of substantially the same flexibility and pliability as the original fabric, and evaporating the remainder of the solvent to cause the cellulose derivative and the wax to become united together and to become united with and impregnated within, but not substantially between, said threads.

11. The process of treating textile fabrics which consists in immersing the fabric in a volatile solvent in which are dissolved a cellulose derivative and an oil both of which are water-repellent and in which is dissolved also a rubber compound, the cellulose derivative being resistant to the attacks of heated washing fluids, and the cellulose derivative and the oil when united together in, and with, the fabric, being as a unit resistant to the attacks of the heated washing fluids, removing the excess solution from the threads of the fabric and from between said threads so as to leave only sufficient to impregnate the individual threads to render the fabric water-repellent but of substantially the same flexibility and pliability as the original fabric, and evaporating the remainder of the solvent to cause the cellulose derivative and the oil to become united together and to become united with and impregnated within, but not substantially between, said threads.

12. The process of treating textile fabrics which consists in immersing the fabric in a volatile solvent in which are dissolved a cellulose derivative, a wax and an oil all of which are water-repellent and in which is dissolved also a toughening agent, the cellulose derivative being resistant to the attacks of heated washing fluids, and the cellulose derivative, the wax and the oil when united together in, and with, the fabric being as a unit resistant to the attacks of the heated washing fluids, removing the excess solution from the threads of the fabric and from between said threads so as to leave only sufficient to impregnate the individual threads to render the fabric water-repellent but of substantially the same flexibility and pliability as the original fabric, and evaporating the remainder of the solvent to cause the cellulose derivative, the wax and the oil to become united together and to become united with and impregnated within, but not substantially between, said threads.

13. The process of treating textile fabrics which consists in immersing the fabric in a volatile solvent in which are dissolved cellulose nitrate, a wax and an oil all of which are water-repellent and in which is dissolved also a rubber compound, the cellulose nitrate being resistant to the attacks of heated washing fluids, and the cellulose nitrate, the wax and the oil when united together in, and with, the fabric being as a unit resistant to the attacks of the heated washing fluids, removing the excess solution from the threads of the fabric and from between said threads so as to leave only sufficient to impregnate the individual threads to render the fabric water-repellent but of substantially the same flexibility and pliability as the original fabric, and evaporating the remainder of the solvent to cause the cellulose nitrate, the wax and the oil to become united together and to become united with and impregnated within, but not substantially between, said threads.

14. The product of the process of claim 6, being a textile fabric having a plastic, a softener and a toughening agent united together and united with and impregnated within, but not substantially between, the individual threads thereof in quantity only sufficient to render the fabric water-repellent but of substantially the same flexibility and pliability as the original fabric, the plastic and the softener both being water-repellent, the plastic being resistant to the attacks of heated washing fluids, and the plastic and the softener when united together in, and with, the fabric being as a unit resistant to the attacks of the heated washing fluids.

WILLIAM B. SERRINGTON.